US009848363B2

(12) United States Patent
Cai et al.

(10) Patent No.: US 9,848,363 B2
(45) Date of Patent: Dec. 19, 2017

(54) SENDING ACCESS INFORMATION FROM PHYSICAL ACCESS CONTROL SYSTEM TO USER TERMINAL

(71) Applicant: Huawei Technologies Sweden AB, Kista (SE)

(72) Inventors: Tao Cai, Kista (SE); Peter Legg, Kista (SE); Johan Mellberg, Kista (SE)

(73) Assignee: Huawei Technologies Sweden AB, Kista (SE)

( * ) Notice: Subject to any disclaimer, the term of this patent is extended or adjusted under 35 U.S.C. 154(b) by 95 days.

(21) Appl. No.: 14/531,684

(22) Filed: Nov. 3, 2014

(65) Prior Publication Data

US 2015/0057000 A1 Feb. 26, 2015

Related U.S. Application Data

(63) Continuation of application No. PCT/EP2012/058168, filed on May 3, 2012.

(51) Int. Cl.
*H04W 36/00* (2009.01)
*H04W 36/08* (2009.01)
(Continued)

(52) U.S. Cl.
CPC .......... *H04W 36/08* (2013.01); *G06F 21/35* (2013.01); *G07C 9/00119* (2013.01);
(Continued)

(58) Field of Classification Search
CPC ..... H04W 36/00; H04W 36/08; H04W 12/08; H04W 36/0077; H04W 48/08; H04B 7/00;
(Continued)

(56) References Cited

U.S. PATENT DOCUMENTS 7,123,915 B1 * 10/2006 Cook .................... H04W 36/32
455/410
7,539,490 B2 * 5/2009 Dickinson ............. H04W 92/02
455/432.1
(Continued)

FOREIGN PATENT DOCUMENTS

CN 1643806 A 7/2005
CN 101909336 A 12/2010
(Continued)

OTHER PUBLICATIONS

"Reconfigurable Radio Systems (RRS); Use Cases for Building and Exploitation of Radio Environment Maps for Intra-operator Scenarios," TR 102 947, V0.0.5, pp. 1-28, European Telecommunication Standards Institute, Valbonne, France (Nov. 2011).
(Continued)

*Primary Examiner* — Huy C Ho
(74) *Attorney, Agent, or Firm* — Leydig, Voit & Mayer, Ltd.

(57) ABSTRACT

A system and method for executing a handover of a mobile communication device from a source access point to a target access point includes an access control module configured to be communicatively coupled to the mobile communication device, a management system communicatively coupled to the access control module and the target access point, and a communication network, access to which is controlled by the target access point. The access control module is configured to provide access information from the management system to a mobile communication device over a short distance communication link to allow the mobile communication device to access the communication network.

20 Claims, 5 Drawing Sheets

(51) Int. Cl.
  *G07C 9/00* (2006.01)
  *H04W 48/04* (2009.01)
  *G06F 21/35* (2013.01)
  *H04W 4/00* (2009.01)
  *H04W 12/08* (2009.01)
  *H04W 48/08* (2009.01)

(52) U.S. Cl.
  CPC ..... *G07C 9/00309* (2013.01); *G07C 9/00571* (2013.01); *H04W 4/008* (2013.01); *H04W 12/08* (2013.01); *H04W 48/04* (2013.01); *G06F 2221/2141* (2013.01); *G07C 2209/63* (2013.01); *H04W 36/0077* (2013.01); *H04W 48/08* (2013.01)

(58) Field of Classification Search
  CPC ............. G06F 21/35; G06F 2221/2141; G07C 9/00119; G07C 9/00309; G07C 9/00571; G07C 2209/63
  USPC ........................................................ 455/436
  See application file for complete search history.

(56) References Cited

U.S. PATENT DOCUMENTS

| | | | | |
|---|---|---|---|---|
| 8,238,921 | B2* | 8/2012 | Chang | ................... H04W 48/08 370/331 |
| 2005/0048972 | A1 | 3/2005 | Dorenbosch et al. | |
| 2005/0079817 | A1 | 4/2005 | Kotola et al. | |
| 2006/0233330 | A1 | 10/2006 | Trell | |
| 2007/0157019 | A1 | 7/2007 | York | |
| 2008/0090613 | A1 | 4/2008 | Dowling | |
| 2009/0098873 | A1* | 4/2009 | Gogic | ................... H04J 11/0069 455/436 |
| 2009/0221283 | A1 | 9/2009 | Soliman | |
| 2010/0056137 | A1 | 3/2010 | Kamei | |
| 2010/0311330 | A1 | 12/2010 | Aibara et al. | |
| 2011/0051683 | A1 | 3/2011 | Ramankutty et al. | |
| 2011/0317569 | A1 | 12/2011 | Kneckt et al. | |
| 2013/0237148 | A1* | 9/2013 | McCann | ............... H04W 4/008 455/41.1 |

FOREIGN PATENT DOCUMENTS

| | | |
|---|---|---|
| CN | 102187714 | 9/2011 |
| EP | 1921880 A1 | 4/2008 |
| WO | WO 2008016778 A2 | 2/2008 |
| WO | WO 2011152999 A1 | 12/2011 |

OTHER PUBLICATIONS

"Reconfigurable Radio Systems (RRS); Use Cases for Building and Exploitation of Radio Environment Maps for Intra-operator Scenarios," TR 102 947, V0.0.6, pp. 1-30, European Telecommunication Standards Institute, Valbonne, France (Mar. 2012).

\* cited by examiner

SENDING ACCESS INFORMATION FROM PHYSICAL ACCESS CONTROL SYSTEM TO USER TERMINAL

CROSS-REFERENCE TO RELATED APPLICATIONS

This application is a continuation of International Patent Application No. PCT/EP2012/058168, filed on May 3, 2012 which is hereby incorporated by reference in its entirety.

BACKGROUND

The aspects of the present disclosure relate generally to wireless communication systems, and in particular to wireless cell access and authentication.

DESCRIPTION OF RELATED ART

A cellular or wireless communication network generally includes a large number of cells. A cell, also referred to as a base transceiver station or base station, is generally defined as a fixed-location transceiver. When a user communicating via a mobile device such as a cellular telephone, a communication link is established between the user's device and a cell. However, a cell has a limited area of communication or network coverage (also referred to range). Thus, a network is typically made up of a number of cells. As the user device moves from one cell (a source cell) to another cell (a target cell), a procedure referred to as "handover" is used to establish a new communication link between the user and the target cell and drop the communication link between the user and the source cell. The changing of the connections during the handover operation can be affected by configuration of the handover procedures and the setting or parameters corresponding to the user's communication device and the cells.

Access to resources such as wireless network cells, computing devices as well as physical buildings, generally requires that the entity that initiates the access attempt provide some form of identification information, which is then verified or authenticated. This process is generally referred to as "authentication." The term "entity" generally refers to a user's device or other communication or computing device that is attempting to access a cell.

Once the entity is authenticated, "authorization" is the process of deciding whether the requested access to or usage of resources is allowed by the authenticated entity. Generally, authentication can be equated with authorization. If an entity is authenticated as a valid entity or user, then access is authorized. The authentication and authorization process can comprise a single step, or multiple steps.

When a user is granted access to a private network, the user is provided with certain access information including any one or a combination of account information, password information, and personal identification code. This granting process is very often manually done (for example at the reception of one restricted building) and can be cumbersome.

In some networks, the handover process can also include the user device receiving and reporting the identification information of the target cell to the source cell to facilitate a handover decision from the source cell to the target cell. For example, in handover from a source cell to a Closed Subscriber Group (CSG) cell, the user device needs to report the CSG Identifier (CSG ID) to the source cell. One example of a Closed Subscriber Group comprises one or several small cellular base stations, referred to as a femtocell. One example of a femtocell is a Home eNode B (HeNB), which is a specific type of access point or Long Term Evolution (LTE) standard femtocell. A femtocell or microcell, as is generally understood has a range on the order of approximately 10-15 meters. A CSG HeNB can broadcast its CSG Identifier, which can be listened to or detected by a user device.

In this type of network, only user devices that have the corresponding CSG identifier in their CSG subscription list are allowed access to the network. Such users are commonly referred to as CSG members. In one operation mode, one CSG HeNB network can provide service to all user devices, regardless of whether or not the device has a subscription with the specific network, but the CSG HeNB network can give preferential treatment to CSG members.

In a wireless communication network, the handover procedure is usually triggered by the change of radio signal strength. When the source cell signal strength is low enough and/or the target cell signal strength is high enough, a handover procedure can be triggered. In non-public communication network, such as for example a private WiFi network or CSG HeNB network, not only the radio signal strength, but also the geo-location information of the user device can be considered in the handover procedure. With the advent of positioning and location determining devices, access to a particular communication network can be correlated with the privilege to access a corresponding geographically located object, such as a building or even a particular area or zone within a building. Handover processes based on signal strength do not use geo-location information, which is often non-optimal or even problematic.

Accordingly, it would be desirable to provide an access and handover process within a communication network that solves at least some of the problems identified above.

SUMMARY OF THE INVENTION

As described herein, the exemplary embodiments overcome one or more of the above or other disadvantages known in the art.

One aspect of the present disclosure relates to a system for executing a handover of a mobile communication device from a source access point to a target access point. In one embodiment, the system includes an access control module configured to be communicatively coupled to the mobile communication device, a management system communicatively coupled to the access control module and the target access point, and a communication network, access to which is controlled by the target access point. The access control module is configured to provide network access information from the management system to a mobile communication device over a short distance communication link to allow the mobile communication device to access the communication network as well as a physical location of the communication network.

Wherein the proximity access control module is associated with a publicly accessible physical site.

Wherein the proximity control module has a communication range of approximately 20 centimeters to 2 meters; or of approximately 2 meters to 20 meters.

Wherein the access control module comprises a physical access control module configured to allow physical access of the mobile communication device to a facility associated with the communication network.

Wherein the access information comprises an account identifier, a password, a pin code, a digital key, a cell identifier, an access control module identifier, a building identifier.

Another aspect of the present disclosure relates to a method for handing over a mobile communication device from a source cell to a target cell. In one embodiment the method includes an agent with a memory in communication with a processor, the memory including program instructions for execution by the processor to detect a proximity of the mobile communication device to an access control module associated with the target cell, establish a short distance communication link between the mobile communication device and the access control module, transfer access information to the mobile communication device that will enable the mobile communication device to access the target cell, and execute a handover of the mobile communication device from the source cell to the target cell using the access information.

BRIEF DESCRIPTION OF THE DRAWINGS

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

In the drawings.

DETAILED DESCRIPTION OF THE DISCLOSED EMBODIMENTS

Figure 1:
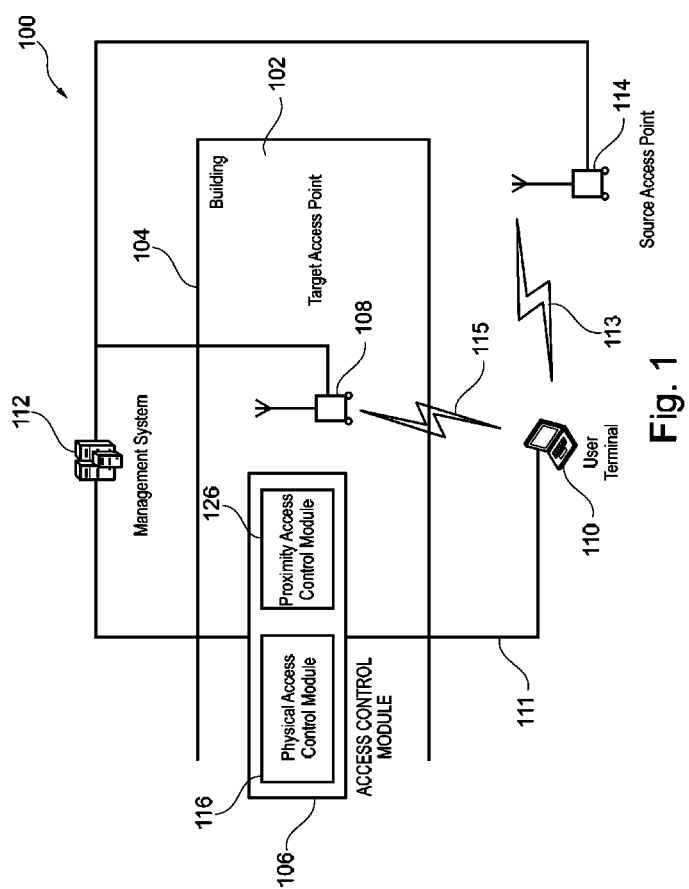
FIG. 1 illustrates a block diagram of one embodiment of system incorporating aspects of the present disclosure.

Referring to FIG. 1, one embodiment of a system 100, for using a short distance communication link to assist in a handover process, incorporating aspects of the present disclosure is illustrated. The aspects of the disclosed embodiments are directed to enabling user authentication, access and handover. The aspects of the disclosed embodiments use a device to device short communication link between an access control module and a user device for transferring access information or credentials to the user device automatically so that the user device can use the access information to handover to the target access point and access the communication network associated with the target access point.

The system 100 of FIG. 1 generally comprises a communication network 102 for a geographical location 104, which for the purposes of the description herein will be referred to as a building or an office. The building or location 104 can comprise a publicly accessible or non-publicly accessible facility and communication network. In alternate embodiments, the geographical location 104 can comprise any suitable facility that includes a typically wireless communication network. In one embodiment, as is shown in the example of FIG. 1, the communication network 102 is configured to provide wireless network (communication) coverage inside the building 104.

In the embodiment of FIG. 1, the building 104 includes an access gateway or control module 106. The access control module 106 is generally configured to provide a user device 110 with access to the building 104 and network 102. In one embodiment, the access control module 106 can comprise one or both of a physical access control module 116 or a proximity access control module 126. In one embodiment, the physical access control module 116 can comprise any device that manages permissions, and provides authentication, authorization and physical access control into the building 104. In one embodiment, the physical access control module 116 can include a RFID reader, or a Near Field communication device, or other short distance communication device, as such devices are generally known. The physical access control module 116 can also include one or more controllers or processing devices and include machine-readable instructions that are executable by a processing device.

In one embodiment, the building 104 is a non-public building where physical access to the building is controlled by the physical access control module 116. When the user device 110 is used to communicate with the physical access control module 116, the physical access control module 116 detects the presence of the user device 110. There is short distance communication interaction between the user device 110 and the physical access control module 116. In one embodiment, this interaction can include the execution of authentication and authorization protocols and processes to determine if the user device 110 (and/or user) is authorized to access the building 104 as well as access the communication network 102 corresponding to the building 104. The communication exchange, generally referred to herein as "interaction" or "interrogation" between the user device 110 and the physical access control module 116 can be via any suitable communication protocol, and can include, but is not limited to, radio frequency identification detection (RFID), near field communication (NFC), Zigbee or Bluetooth technologies. The communication interaction between the user terminal 110 and the physical access control module 116 is generally over any suitable short range communication protocol that allows communication between a user device 110 and the physical access control module 116 over a predetermined distance. In this embodiment, the access information is granted after an authentication process. In another embodiment, where the access control module 106 is a proximity access control or communication module 126, access can be granted based on the proximity of the device 110 and the proximity control module 126, without the need for authentication. The proximity access control module 126 can also include one or more controllers or processing devices and include machine-readable instructions that are executable by a processing device.

In one embodiment of the exemplary system 100 shown in FIG. 1, the user terminal or device 110 is configured to communicate with the access control module 106 over a short distance. In the examples described herein the term "short distance" will generally include a distance in the range of approximately 1 mm to and including 20 cm. For example, referring to FIG. 1, the building 104 is a public building, such as a shopping mall, where physical access is allowed to the general public. The access control module 106 in this embodiment is a proximity access control module 126, which will set up a short distance communication link with user device 110. In this embodiment, there is no authentication or authorization function associated with the proximity access control module 126. This means that once a user device 110 has established a short distance communication with the proximity access communication module 126, the user device 110 will be enabled to communicatively couple to the communication network 102 corresponding to the building 104. In a public building, such as the shopping mall, as long as the mobile device 110 is close enough to the proximity access communication module 126, proximity module 126 will transfer the access information to the mobile device 110 and the mobile device 110 uses the access information to access the wireless network which covers this building 102.

In the conventional network, the access information is broadcast so every mobile device, even outside of a building, can receive the access information and access the wireless network, even though the network may only be intended to only cover an area inside the building. In accordance with the aspects of the disclosed embodiments, a mobile device 110 has to be within a prescribed range relative to the proximity access control module 126 to receive the access information. In this embodiment, the aspects of the disclosed embodiments advantageously ensure that only the mobile device(s) 110 within range of the proximity module 126 can access the indoor wireless network 102.

The communication exchange, generally referred to herein as "interaction" between the user device 110 and the proximity access control module 126 can be via any suitable communication protocol, and can include, but is not limited to, radio frequency identification detection (RFID), near field communication (NFC), Zigbee or Bluetooth technologies. The communication interaction between the user terminal 110 and the proximity communication module 126 is generally over any suitable short range communication protocol that allows communication between a user device 110 and the proximity communication module 126 over a predetermined distance such as from approximately 20 cm up to and including 2 m. In alternate embodiments, any suitable range or distance can be set. For example, it may be desirable to place the proximity access control module 126 such that proximity access control module 126 only engages user devices 110 that are inside the building 104.

Referring to FIG. 1, the building 104 is also associated with or includes a target access point 108, also referred to as a "cell" as is otherwise defined herein. The target access point 108 can generally comprise, for example, a wireless access point (or more than one access point) that allows wireless devices 110 to connect to wireless network, such as the network 102 illustrated in FIG. 1. The wireless access point and wireless networks referred to herein can generally use Wi-Fi, cellular, or other such communication technologies.

In one embodiment, referring to FIG. 1, there can also be a communication connection between the access control module 106 and a management system 112. The management system 112 is generally configured to store, or has access to, the information that is needed to access the target cell 108. This can include the storage of physical access identifiers for the physical access control module 116 and proximity access control module 126, identifiers for the building 104, passwords, as well as any other authentication and authorization information and data. In one embodiment, the management system 112 includes or is coupled to one or more memory devices for the storage of such or similar data. In one embodiment, the management system 112 is in communication with the access control module 106 and the target access point 108 via wired or wireless connections. The management system 112 generally includes, is coupled to or is communication with a processor that is operable to receive and monitor the access information described herein. In one embodiment, the management system 112 is comprised of machine-readable instructions that are executable by a processing device.

The management system 112 can comprise a communication module or server that is configured to communicate and exchange data and information with one or more of the target access point 108 and the source access point 114. The communication and data exchange can take place over any suitable wired or wireless network.

In one embodiment, the target access point 108 is configured to be accessed only by user devices 110 that are allowed access to the building 104. The term "allowed" as used herein, is generally intended to mean authenticated and authorized by the physical access control module 116. The physical access control module(s) 116 can be installed near the door of the building 104 to provide processing and control for connected entranceway hardware, such as card readers, electronic locks, RFID devices and other input and output devices than can enable building access. In the embodiment where the building 104 is a non-publicly accessible building, the physical access control module 116 is configured to interact with user device(s) 110, and the physical access control module 116 can send access information to a user device 110 after the authentication is finished. The access information will enable the user device 110 access to the target access point 108.

In one embodiment, the target access point 108 is configured to be accessed by a user device(s) 110 that has entered building 104 and has a communication connection with a proximity access control module 126. In the embodiment where the building 104 is a publicly accessible building, the proximity access control module 126 can be configured to interact with user terminals 110, and the proximity access control module 126 can send access information to a user device 110, within a short distance, that will enable the user device 110 access to the target access point 108.

When a user leaves the building 104, the access information that was provided to the user device 110 can be rendered invalid. This can occur from interaction between the user device 110 and the access control module 106. In one embodiment, when the access control module 106 detects that the user device 110 is no longer in the building 104, or within a reasonable proximity, the access information can be deleted or otherwise invalidated. For example, in one embodiment, the access control module 106 can be installed inside door of the building 104. The user device 110 needs to interact with access control module 106 in order to open the door and leave the building 104, during which the access information can be rendered invalid. In one embodiment, the access information can be rendered invalid after it is detected that the user device 110 has no interaction with the access control module 106, or is no longer communicatively coupled, or has gone out of range.

In one embodiment, multiple access control modules 106 can be provided in, around or both in and around the building 104. This can include physical access control modules 116 on the outside and insider of a door of building 104 and multiple proximity access control modules 126 inside building 104, for example. The communication range of proximity access control modules 126 that are in the center of the building 104, for example, can be in the range of approximately 2 meters up to and including 20 meters, while the communication range of proximity access control modules 126 that are close to the border of the building 104 can be less, in the range of approximately 20 cm up to and including 2 meters, for example.

The aspects of the disclosed embodiments advantageously provide that when the building 104 is a non-publicly accessible building, the wireless network service coverage provided by the wireless network 102 inside the building 104 will be provided to or only enabled for user devices 110 that are allowed access to enter the building 104. When the building 104 is a publicly accessible building, the wireless network service coverage provided by the wireless network 102 inside the building 104 will not be provided to user devices 110 that are passing by or outside of the building 104.

In one embodiment, the wireless network service coverage provided by the wireless network 102 can allow the user device 110 to handover from the source access point 114 to the target access point 108. The handover enables the user device 110 to communicate with the target access point 108 over the communication channel 115. The wireless network 102 can also allow the user device 110 to receive preferential treatment while the user device 110 is connected to the wireless network 102, such as for example, a higher service or data rate when the target access point 108 is a CSG cell and user device 110 is member of the CSG group which comprises target access point 108.

Figure 2:
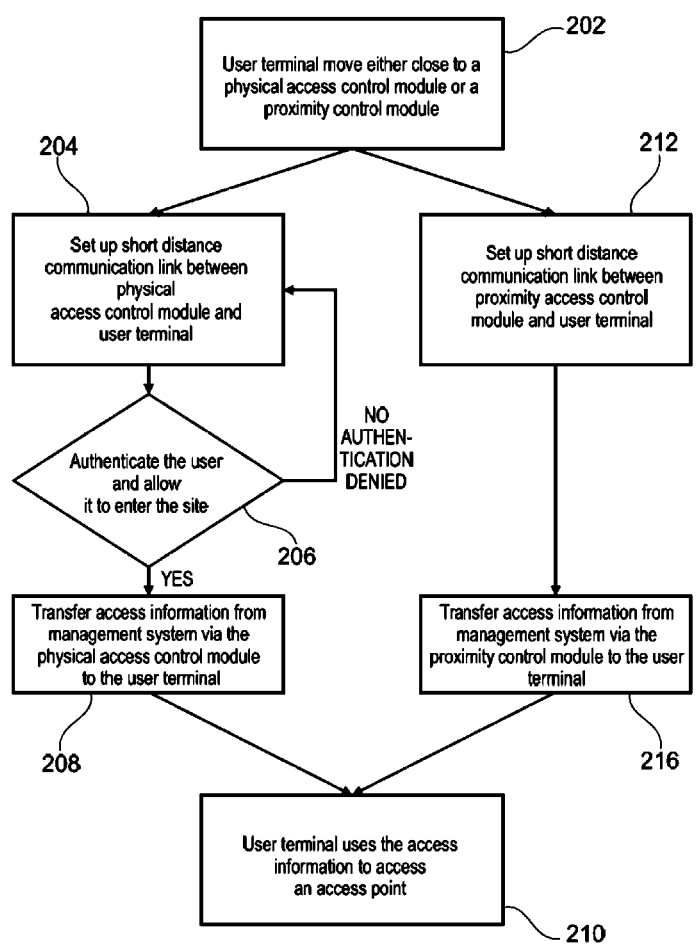
FIG. 2 illustrates one embodiment of a cell access process flow incorporating aspects of the present disclosure.

FIG. 2 illustrates one embodiment of process incorporating aspects of the disclosed embodiments. Referring also to FIG. 1, the user device 110 is communicatively coupled to the source access point 114, which is typically over a communication channel 113 as is generally understood. In one embodiment, the user device 110 comes in communication range 111 of or proximity 111 to the building 102 which includes a physical access control module 116. The user device 110 is detected 202 is detected by the physical access control module 116.

A short distance communication link 111 between the physical access control module 116 and the user device 110 is established 204. The physical access control module 116 determines 206 whether to authenticate the user device 110 and, if authenticated, enables the user to access the building 104. If not authenticated, the process can start over or further attempt authentication. In one embodiment, determining 206 if the user or user device 110 is authenticated can include the user device 110 requesting access to the network 102 of the building 104. The request can be an affirmative request by the user device 110, or the physical access control module 116 automatically detecting and authenticating the user device 110. This can include the physical access control module 116 interrogating the user device 110.

Once the user device 110 is authenticated and authorized, the physical access control module 116 transfers 208 the access information to the user device 110 that will enable the user device 110 to access the wireless network 102 via the target access point 114. In one embodiment, the physical access control module 116 transfers 208 the access information from the management system 112 to the user device 110. In this embodiment, the access information can include, but is not limited to, an account identifier, password, pin code, key, CSG identifier, physical access control module identifier or building identifier, or any combination thereof. The access information can be pre-stored in the physical access control module 116 or can be sent by the management system 112.

The user device 110 then uses the access information to enable 210 a communication connection or channel with the target access point 108, and allow the user device to access the network 102, without user or other human intervention. In the case of a handover from the source access point 114 to a target cell 108 that comprises a CSG cell, the user device 110 can report the obtained CSG identifier to the source access point 114 in order to facilitate a handover decision.

In the embodiment where the access control module 106 comprises a proximity access control module 126, the proximity of the user or user device 110 is detected 202. A short distance communication link is established 212 between the proximity access control module 126 and the user device 110. The access information that will allow the user device to access the target access point 108 and network 102 is transferred 216 from the management control system 112 to the proximity access control module 126 and to the user device 110. The user device 110 then uses the access information to enable 210 a communication connection or channel with the target access point 108, and allow the user device to access the network 102. This can include a handover from the source access point 114 to the target access point 108.

Figure 3:
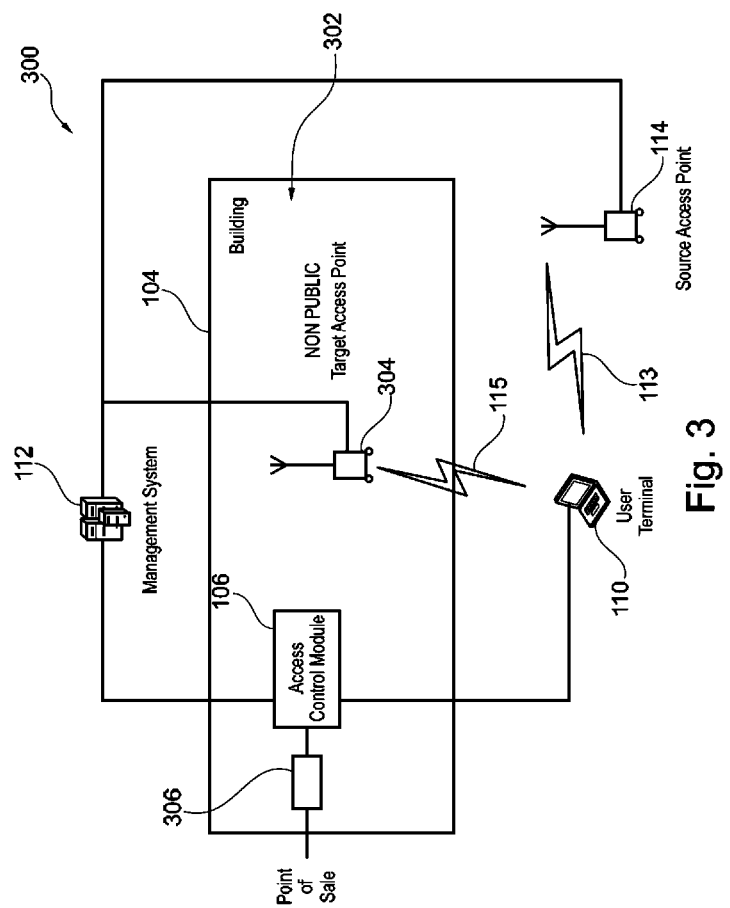
FIG. 3 illustrates a block diagram of one embodiment of system incorporating aspects of the present disclosure.

Referring to FIG. 3, one embodiment of a system 300 incorporating aspects of the present disclosure is illustrated. In this embodiment, the communication network of the building or facility 104 is a non-public network 302, and the target access point is non-public access point 304. In the embodiment of FIG. 3, the access control module 106 of FIG. 1 is embedded with, or includes, a Point-of-Sale device 306. In one embodiment, the point-of-sale device 306 comprises a payment terminal, such as that found in a shop or a restaurant. Thus in this example, the building 104 is a shop, restaurant or other commercial facility. In one embodiment, the payment terminal is a wireless capable device. When a user makes a payment through the point of sale device 306, the access control module 106 authenticates and authorizes the user device 110 to the non-public network 302. The user device 110 receives the access information from access control module 106, and the user device 110 is enabled to connect to the non-public access point 308 of the non-public network 302 via the communication channel 115, from the handover from the source cell 114 to the target cell 304. In one embodiment, the user device 110 can be placed in short distance communication proximity to the access control module 106 to receive the access information. In this embodiment, a distance between the user device 110 and the access control module 106 can be less than 1 centimeter. In alternate embodiments, any suitable distance can be used that prevents unauthorized access to the non-public network 302.

Figure 4:
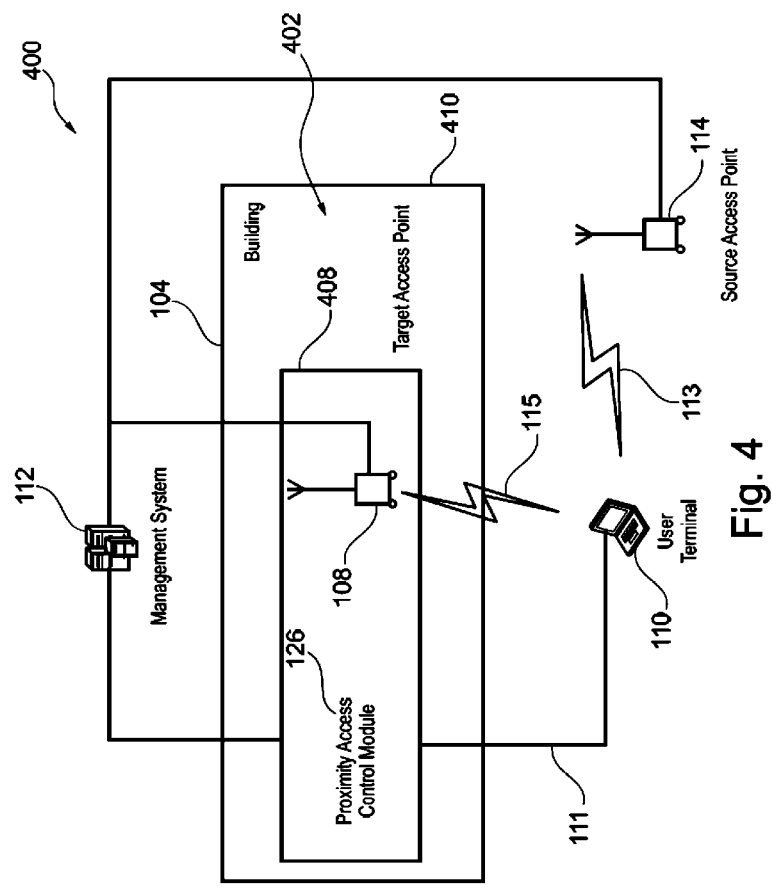
FIG. 4 illustrates a block diagram of another embodiment of system incorporating aspects of the present disclosure.

FIG. 4 illustrates one embodiment of a system 400 incorporating aspects of the present disclosure. In this embodiment, the access control module 106 is a proximity access control module 126 that is integrated with the access point 108 to form an integrated target access point 408. When the user device 110 is in physical proximity to the target access point 408 for a pre-defined time period, the user device 110 is allowed to connect to the radio or communication network 402 served by the target access point 408. In this example, the physical proximity distance can be approximately less than one (1) meter, while the pre-defined time period that the user device 110 needs to be in proximity with the network 402 can be approximately or at least three (3) seconds. The proximity access control module 126 can enable the user device 110 to remain connected to the network for a pre-determined period of time, such as for example six (6) hours. The distances and time periods referred to herein are merely exemplary, and in alternate embodiments, any suitable proximity, distance and time periods can be used that will generally prevent or limit unauthorized access to the network 402. In one embodiment, the integrated target access point 408 can be useful for providing a visitor guest access to a home CSG cell, such as target access point 408.

Figure 5:
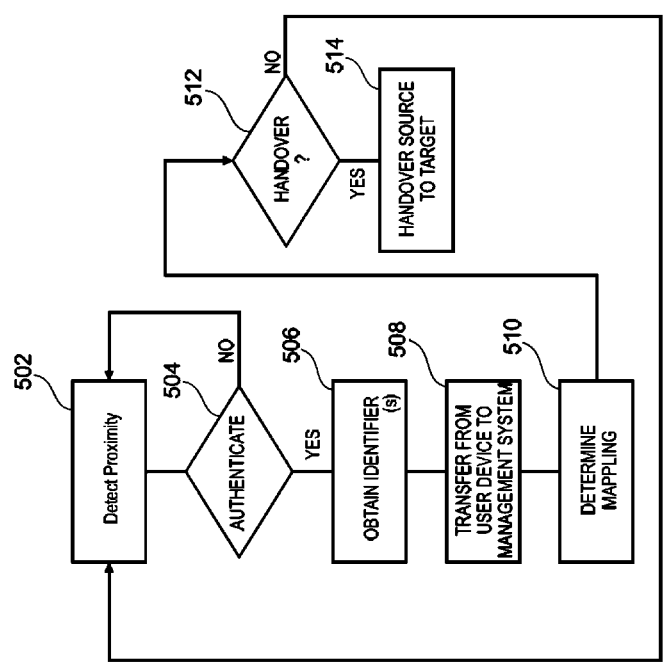
FIG. 5 illustrates one embodiment of a cell handover process flow incorporating aspects of the present disclosure.

Referring to FIG. 5, one embodiment of a handover process in a system incorporating aspects of the present disclosure is illustrated. In this embodiment, control module 106 of FIG. 1 detects 502 the user device 110. Where applicable, the access control module 106 authenticates 504 the user/user device 110. In the embodiment where the access control module 106 is a proximity access control module 126, there is no authentication. The user device obtains 506 one or both of an identifier of the control module 106 or an identifier of the building 104. In one embodiment, obtaining 506 the identifiers can include transferring the identifiers from the control module 106 to the user device 110. The user device 110 can transfer 508 the identifiers to the management system 112 via the source access point 114, to which the user device 110 is communicatively connected. The management system 112, by accessing a database or other suitable memory or data storage device, can determine 510 a mapping of one or both of the access control module identifier, building identifier to an identifier 506 of the target access point, which can include a CSG identifier. A CSG identifier is then used in handover to the target CSG cell. In one embodiment, a decision 512 can be made to allow the user device 110 to handover 514 from the source access point 114, referenced in this embodiment as a target CDG cell. The management system 112 in this embodiment can be configured to execute the functions of a mobility or handover management entity, a database management entity and a database. The aspects of the disclosed embodiments can be applied in similar manners for changing the connection between the source access point 114 and the target access point 108, when the user device 110 is in an idle mode using a cell selection operation.

The disclosed embodiments may also include software and computer programs incorporating the process steps and instructions described above. In one embodiment, the programs incorporating the process described herein can be stored on or in a computer program product and executed in one or more computers. One or more of the devices of the system 100 shown in FIG. 1 can each include computer readable program code means stored on a computer readable storage medium for carrying out and executing the process steps described herein. In one embodiment, the computer readable program code is stored in a memory of one or more of the devices shown in FIG. 1. In alternate embodiments, the computer readable program code can be stored in memory or memory medium that is external to, or remote from system 100. The memory can be direct coupled or wireless coupled.

In one embodiment, the devices shown in the system 100 of FIG. 1 may include and/or be coupled to one or more processor devices or computer systems that are capable of sending information to each other and receiving information from each other. In one embodiment, the network 102 can be communicatively coupled with the Internet. The devices shown in FIG. 1 can be linked together in any conventional manner, including for example, a modem, wireless connection, hard wire connection, fiber optic or other suitable data link. Information can be made available to the devices shown in the system 100 of FIG. 1 using a communication protocol typically sent over a communication channel or other suitable communication line or link.

The devices of the system 100 shown in FIG. 1 are generally configured to utilize program storage devices embodying machine-readable program source code that is adapted to cause the apparatus to perform and execute the method steps and processes disclosed herein. The program storage devices incorporating aspects of the disclosed embodiments may be devised, made and used as a component of a machine utilizing optics, magnetic properties and/or electronics to perform the procedures and methods disclosed herein. In alternate embodiments, the program storage devices may include magnetic media, such as a diskette, disk, memory stick or computer hard drive, which is readable and executable by a computer. In other alternate embodiments, the program storage devices could include optical disks, read-only-memory ("ROM") floppy disks and semiconductor materials and chips.

The devices of the system 100 of FIG. 1, including the access control module 106, target access point 108, user device 110, management system 112, source access point 114 and communication network 102 may also include one or more processors for executing stored programs, and each may include a data storage or memory device on its program storage device for the storage of information and data. The computer program or software incorporating the processes and method steps incorporating aspects of the disclosed embodiments may be stored in one or more computer systems or on an otherwise conventional program storage device.

The aspects of the disclosed embodiments allow for handover and cell selection operations in a wireless network, cellular network, ad hoc network, or such other suitable communication network. A device to device communication link is established between a user device or terminal and a control module. The access control module can include one or both of a physical access control module or a proximity access control module. Access information is transferred to the user device from the access control module. The access information allows the user device to connect in a handover process to a target access point. The access information can be pre-stored or randomly generated. The access information can be transferred from a management system that stores or obtains the access information on demand. The access information can be transferred to the user device after the user device is allowed to enter the physical site, or as the user device is within proximity or a pre-determined distance of the control module.

Thus, while there have been shown, described and pointed out, fundamental novel features of the invention as applied to the exemplary embodiments thereof, it will be understood that various omissions and substitutions and changes in the form and details of devices illustrated, and in their operation, may be made by those skilled in the art without departing from the spirit and scope of the invention. Moreover, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A system for initiating a connection of a mobile communication device (MCD) to a target wireless access point (TWAP) providing access to a communication network, the system comprising:
an access control apparatus, physically separate from the TWAP, comprising a processor and a non-transitory computer-readable medium including computer-executable instructions for configuring the processor to carry out a method comprising:
establishing a device to device short communication link connection between the access control apparatus and the MCD; and
communicating, by the access control apparatus via the device to device short communication link connection, an access information to the MCD, wherein the access information enables the MCD to establish access to the communication network via a wireless connection, distinct from the device to device short communication link connection, between the MCD and the TWAP,
wherein the communicating the access information to the MCD is carried out in response to a triggering condition taken from the group consisting of:
detecting, by the access control apparatus, a presence of the MCD within a detection range of the access control apparatus, and
authenticating the MCD based upon authentication information provided by the MCD to the access control apparatus via the device to device short communication link connection, and
wherein the access information communicated by the access control apparatus to the MCD is sufficient to confirm the access by the MCD to the communication network without a further communicating between the TWAP and the access control apparatus after the communicating the access information to the MCD by the access control apparatus.

2. The system of claim 1, wherein the access control apparatus is associated with a non-publicly accessible physical site, and wherein the method further comprises enabling a physical access to the non-publicly accessible physical site responsive to the authenticating.

3. The system of claim 1, wherein the access control apparatus is configured to communicatively interact with the MCD over an embedded short distance communication device, wherein the embedded short distance communication device has a range that is shorter than a wireless communication range of the TWAP.

4. The system of claim 1, wherein the access control apparatus is connected to a point-of-sale terminal; and
wherein the method further comprises:
processing, after the establishing the device to device short communication link connection, a payment in a Point-of-Sale device associated with the access control apparatus; and
transferring the access information to the MCD only after the payment is confirmed by the Point-of-Sale device.

5. The system of claim 1 further comprising a management node, communicatively coupled to the access control apparatus, wherein the management node comprises:
a management node processor, and
a non-transitory computer-readable medium including:
at least a portion of the access information that enables the MCD to access the TWAP, and
computer-executable instructions for configuring the management node to carry out a method including:
transferring the portion of the access information to the access control apparatus, and
exchanging information with the TWAP.

6. The system of claim 1 wherein the access control apparatus carries out the communicating within a range of less than 1 centimeter.

7. The system of claim 1 wherein the access control apparatus carries out the communicating within a range of less than 1 meter.

8. The system of claim 1 wherein the connection between the MCD and the TWAP is carried out in a handover operation between a source cell and a target cell.

9. The system of claim 1 wherein the TWAP is a WiFi wireless access point to the communication network.

10. A method for initiating a connection of a mobile communication device (MCD) to a target wireless access point (TWAP) providing access to a communication network, by an access control apparatus, the method comprising:
establishing a device to device short communication link connection between the access control apparatus and the MCD; and
communicating, by the access control apparatus via the device to device short communication link connection, an access information to the MCD, wherein the access information enables the MCD to establish access to the communication network via a wireless connection, distinct from the device to device short communication link connection, between the MCD and the TWAP,
wherein the communicating the access information is carried out in response to a triggering condition taken from the group consisting of:
detecting, by the access control apparatus, a presence of the MCD within a detection range of the access control apparatus, and
authenticating the MCD based upon authentication information provided by the MCD to the access control apparatus via the device to device short communication link connection, and
wherein the access information communicated by the access control apparatus to the MCD is sufficient to confirm the access by the MCD to the communication network without a further communicating between the TWAP and the access control apparatus after the communicating the access information to the MCD by the access control apparatus.

11. The method of claim 10, further comprising:
authenticating, by the access control apparatus, the MCD for the case of a restricted physical site, wherein the access control apparatus comprises a short distance communication interface for receiving, pursuant to the authenticating, authentication information from the MCD for obtaining authorized access to the restricted physical site.

12. The method of claim 11, further comprising:
enabling a physical access to a building corresponding to the TWAP responsive to the authenticating.

13. The method of claim 11, further comprising:
enabling, responsive to the authenticating, a physical access to a building, which is controlled by a physical access limiting device controlled by the access control apparatus; and transferring the access information to the MCD only after the authenticating and determining authorization for the physical access to the building.

14. The method of claim 11, further comprising:
obtaining, by the access control apparatus, the access information from a management server after the authenticating.

15. The method of claim 11, further comprising performing, in response to the authenticating, the further operations of:
receiving an identifier associated with the access control apparatus;
transferring the identifier to a management server for mapping the identifier to a target cell identifier corresponding to the TWAP; and
executing a handover from a source cell to a target cell, corresponding to the TWAP, based on the target cell identifier.

16. The method of claim 10, wherein the access control apparatus carries out the communicating within a range of less than 1 centimeter.

17. The method of claim 10, wherein the access control apparatus comprises a proximity access control device that is a short distance communication device, and wherein the method comprises:

determining, during the detecting, that the mobile communication device is inside a building using short-distance communication between the MCD and the proximity access control device;
transferring the access information from the proximity access control device to the MCD.

18. The method of claim 10, further comprising:
processing, after the establishing the device to device short communication link connection, a payment in a Point-of-Sale device associated with the access control apparatus; and
transferring the access information to the MCD only after the payment is confirmed by the Point-of-Sale device.

19. The method of claim 10, further comprising:
inactivating, in response to a further triggering condition after the communicating, the access information provided to the MCD via device to device short communication link connection.

20. The method of claim 10, wherein the access control apparatus carries out the communicating within a range of less than 1 meter.

* * * * *

UNITED STATES PATENT AND TRADEMARK OFFICE
CERTIFICATE OF CORRECTION

PATENT NO. : 9,848,363 B2
APPLICATION NO. : 14/531684
DATED : December 19, 2017
INVENTOR(S) : Cai et al.

It is certified that error appears in the above-identified patent and that said Letters Patent is hereby corrected as shown below:

On the Title Page

Page 2, Foreign Patent Documents, Column 2, Line 18, reference EP1921880A1 "4/2008" should read -- 5/2008 --.

Signed and Sealed this
First Day of May, 2018

Andrei Iancu
*Director of the United States Patent and Trademark Office*